Dec. 6, 1938.     G. HUGHES     2,139,500
CAR COOLER
Filed Nov. 20, 1937     3 Sheets-Sheet 2

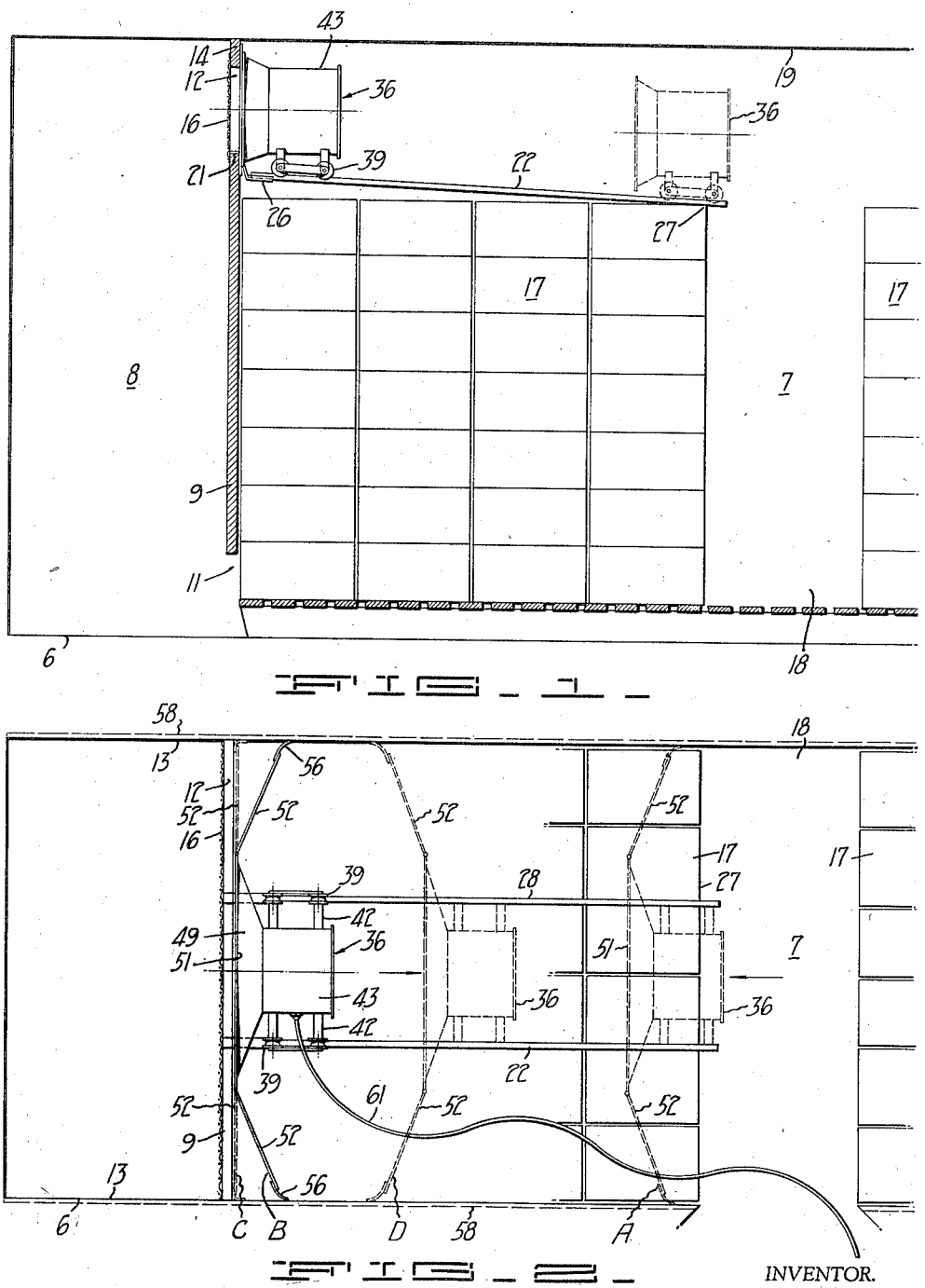

INVENTOR.
George Hughes
BY
ATTORNEY.

Dec. 6, 1938.         G. HUGHES         2,139,500
CAR COOLER
Filed Nov. 20, 1937         3 Sheets-Sheet 3

INVENTOR.
George Hughes
BY *Massus Lothrop*
ATTORNEY.

Patented Dec. 6, 1938

2,139,500

UNITED STATES PATENT OFFICE 2,139,500

CAR COOLER

George Hughes, Lodi, Calif., assignor to The Union Ice Company, San Francisco, Calif., a corporation of California Application November 20, 1937, Serial No. 175,657

12 Claims. (Cl. 62—24)

My invention relates to means for facilitating the use of portable car precoolers, particularly of the type shown in Phillips Patent No. 2,019,796, dated November 5, 1935. In the customary use of such a device it is either necessary to position it in a refrigerator car over the upper bunker opening and against the bulkhead with the fastenings provided for such purpose, prior to placing any load in the load compartment of the car, or it is necessary for an operator to crawl over the load in a car with a disassembled precooling unit and then erect the unit in position over the upper bunker opening. In either case, when the precooling operation has been completed it is necessary for an operator to crawl over the load, disassemble the precooling unit, and carry it out over the load to the outside of the car. This operation is awkward and cannot readily be accomplished by a single operator. Furthermore, in the event the load is an easily injured commodity, such as grapes or apricots, for example, the weight of the equipment and of the operator being moved over the top of the load will be prone to cause damage, and accidental movement of the equipment or of the operator may damage such a quantity of produce as to nullify the financial benefit of the precooling operation.

It is therefore an object of my invention to provide a car cooler which can readily be positioned and removed without requiring an operator to move over a load in the car.

Another object of my invention is to provide a car cooler which is securely held in place during operation.

A further object of my invention is to provide a car cooler which is readily removable when its operation has been completed.

A further object of my invention is in general to provide means for facilitating the precooling of cars.

The foregoing and other objects are attained in the embodiment of the invention illustrated in the drawings, in which Fig. 1 is a longitudinal cross-section on a vertical plane in a typical refrigerator car in which the car cooler of my invention is utilized;

Fig. 2 is a cross-section of the car of Fig. 1, but on a horizontal plane, showing the car cooler of my invention in use.

Figure 3:
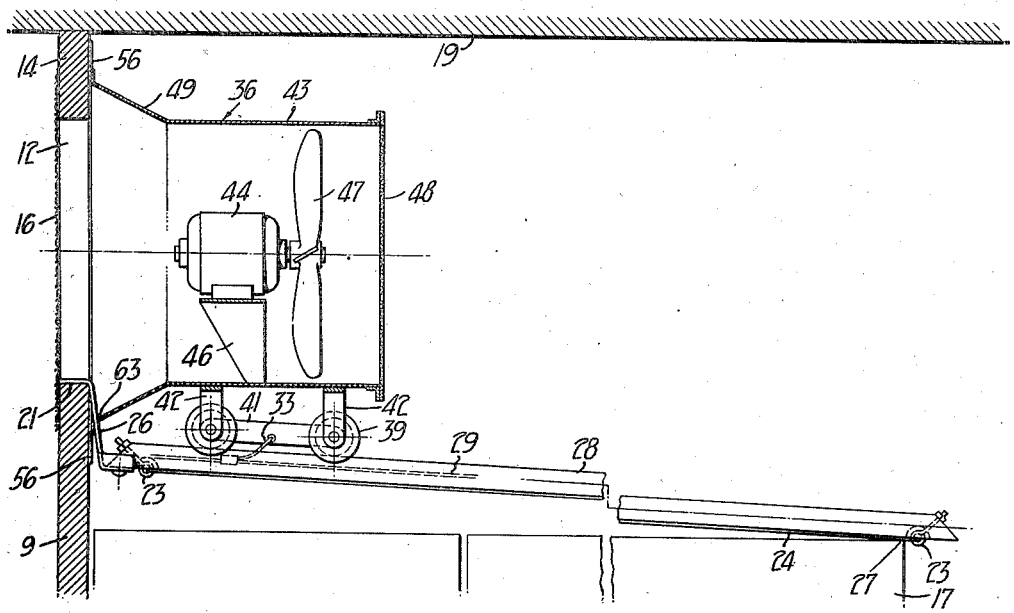
Fig. 3 is a cross-section similar to Fig. 1, but on an enlarged scale.
Figure 4:
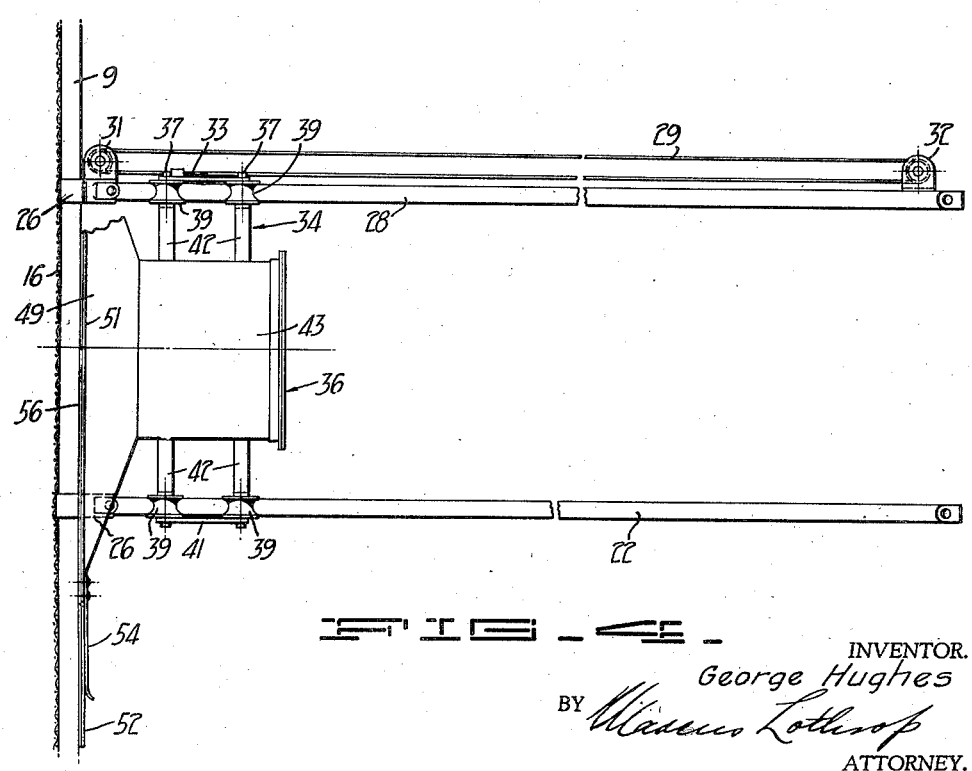
Fig. 4 is a plan similar to Fig. 2, but on an enlarged scale.

In its preferred form, the car cooler of my invention is for use in a refrigerator car having an ice compartment and a load compartment separated by a bulkhead wall defining an upper bunker opening, and includes a closure for said opening which is supported against gravity but is movable against said bulkhead as the result of the operation of a fan preferably mounted on the closure so that the closure is urged closely to overlie the opening.

In a typical environment, the car cooler of my invention is utilized in conjunction with a refrigerator car 6 having a load compartment 7 and an ice compartment 8 which are separated by a bulkhead wall 9 open at its lower end to provide a lower bunker opening 11 affording communication between the ice compartment 8 and the load compartment 7, and likewise having an upper bunker opening 12 affording communication between the load and ice compartments respectively. Usually, the upper bunker opening 12 extends across the car from one side wall 13 thereto to the other and is defined along its upper portion by an abutment 14 which in effect is a continuation of the bulkhead wall 9. A screen 16 ordinarily extends across the opening 12 on the ice-compartment side, to preclude the passage of pieces of ice into the load compartment.

When the car is loaded, crates or lugs or boxes 17 of produce, for example, are arranged in the load compartment 7 in regular rows and tiers, so as to provide a generally cubical assembly. In each car two such assemblies are disposed, so that there remains a central transverse aisle 18 through which communication to the car door is had and which finally is filled with bracing or bridging in order that the two assemblies 17 will be braced against each other during transit. It is ordinarily advisable to provide a large number of layers of containers in each of the load assemblies, so that the space between the top layer and the ceiling 19 of the car is relatively limited. Nevertheless, in no instance does the top layer of boxes 17 extend above the upper edge 21 of the bulkhead wall 9. There may be, and are, variations in the height of the load, depending upon the particular character of packages used, within a range approximately as indicated in Fig. 1.

My invention includes means for facilitating the positioning and removal of a precooling device over the upper bunker opening 12. For this reason I provide a rail 22, preferably comprising a length of light but durable wood, having a semicircular upper contour, and at opposite ends being pierced by eyelets 23 anchoring a relatively taut tension wire 24. When a load is placed upon the rail 22, the wire 24 yields very little under the further tension and maintains an exceedingly rigid, though light, structure. At one end of the rail 22 I fasten a preferably offset and extended hook 26, contoured to rest firmly upon the upper edge 21 of the bulkhead wall 9. At its other end the rail rests upon the upper corner 27 of the load assembly 17, or upon a strip or brace adjacent thereto. While various supports and positions for the rail are feasible, it is preferably disposed so that it is approximately horizontal and so that it extends from a position adjacent the central passageway 18 to a position adjacent the bulkhead wall 9. Alongside of and parallel to, but spaced from, the rail 22 I provide a comparably constructed rail 28 which, in addition, is provided with a propelling mechanism. This is preferably in the form of an endless cable 29 extending over pulleys 31 and 32 at opposite ends of the rail 28.

At a point in its length the cable 29 is provided with a snaffle hook 33 for engagement with a carriage 34 underlying the central member of a closure 36 designed to overlie the upper bunker opening 12. The carriage 34, for example, includes a pair of transverse axles 37 which terminate in deeply grooved rollers 39 contoured to run upon the rails 22 and 28, being suitably spaced by straps 41.

On the axles 37 rests a supporting structure 42 engaged with a cylindrical air conduit 43 of the precooling unit. The precooling unit includes an electric motor 44 mounted on a bracket 46 attached to the cylinder 43 and driving an air propelling fan 47 for discharging air from the ice compartment 8 into the load compartment 7. A screen 48 overlies the outlet of the cylindrical portion 43, while an adapter 49 effects the gradual merging of the contour of the cylindrical portion 43 with that of a rectangular plate 51 included in the closure. The plate 51 is of ample height to overlie the upper bunker opening 12 and to overlap the upper edge 21 of the bunker wall 9 and the abutment 14. It is not, however, quite of sufficient width to span the distance between the side walls 13 of the car.

Included in the closure are side plates 52, each of which is secured to the central portion 51 by a hinged connection 53. Each side portion is of substantially the same height as the central part and is of sufficient lateral extent substantially to occupy the remaining distance between the side walls of the car. Any suitable means, such as leaf springs 54, exert force upon the side wings to position them in substantially the same plane as the central portion.

In order to provide an effective seating or abutment of the closure with respect to the bulkhead wall 9 including the upper abutment 14, I preferably surround the entire closure, including the central part 51 and the side plates 52, with a deformable strip 56 of rubber or comparable material, secured to suitable parts of the closure.

In the operation of this structure, after the loading of the car the rails 22 and 28 are positioned and the entire closure, including the side wings 52, is mounted thereupon adjacent the aisle 18. The rollers 39 are placed in engagement with the rails, and the snaffle hook 33 is attached to the carriage 34. By suitable manipulation of the cable 29 the entire precooling unit is advanced along the rails until it is in approximate abutment with the bulkhead 9. During this time, in the event the side walls of the car are sufficiently close as to necessitate it, the side wings 52 occupy substantially the dotted line position A of Fig. 2, with the rubber sealing strip 56 sufficiently deflected. In the event the width of the car is somewhat greater (which variation often occurs in practice), as indicated by the dotted lines 58 of Fig. 2, then the side wings 52 are somewhat more nearly planar than they are shown in the figure and the rubber strip deflection may be less. When the structure is substantially in contact with the abutment 9, it occupies approximately the full-line position B shown in Fig. 2. An electric conductor 61 extends from the motor 44 over the load to a suitable source of electricity.

As soon as the motor 44 is energized, the fan 47 is effective to create a flow of air from the ice compartment 8 into the load compartment 7, thereby establishing a higher pressure within the load compartment 7 than exists within the ice compartment 8. The direction of flow through the fan, therefore, is away from the bulkhead 9 toward the load compartment, so that the thrust of the fan 47 is in an opposite direction or toward the bulkhead 9. The result of the difference in pressure and of the fan thrust is that the entire closure is very firmly pressed against the bulkhead 9 and the abutment 14, without the need of temporary or other fasteners of any sort. That is, the closure unit is preferably supported against gravity only, is freely movable horizontally, and is urged horizontally against the abutment with a tight seal thereagainst by the actions of the difference in air pressure and of the fan thrust, so that there is no leakage around the edges of the unit. The effect of this pressure is also to move the side wings 52 into substantially a planar position, indicated by the dotted lines C in Fig. 2, with the rubber sealing strip 56 considerably deformed—although this varies somewhat with the differences in width of cars.

As soon as the precooling operation has been concluded and flow of current through the conductor 61 is interrupted to stop the operation of the fan 47, there is no longer a difference in pressure tending to urge the unit against the bulkhead, and if the incline of the rails 22 and 28 alone is not sufficient, then a pull upon the cable 29 is sufficient to run the carriage back to its original position adjacent the passageway 18. During this return movement the side wings 52 may occupy a position as shown by the dotted lines D of Fig. 2. When the cooling unit is adjacent the aisle 18 it can be removed from the rails and the rails can be lifted from the bulkhead 9 and the entire equipment readily removed from the car.

Figure 5:
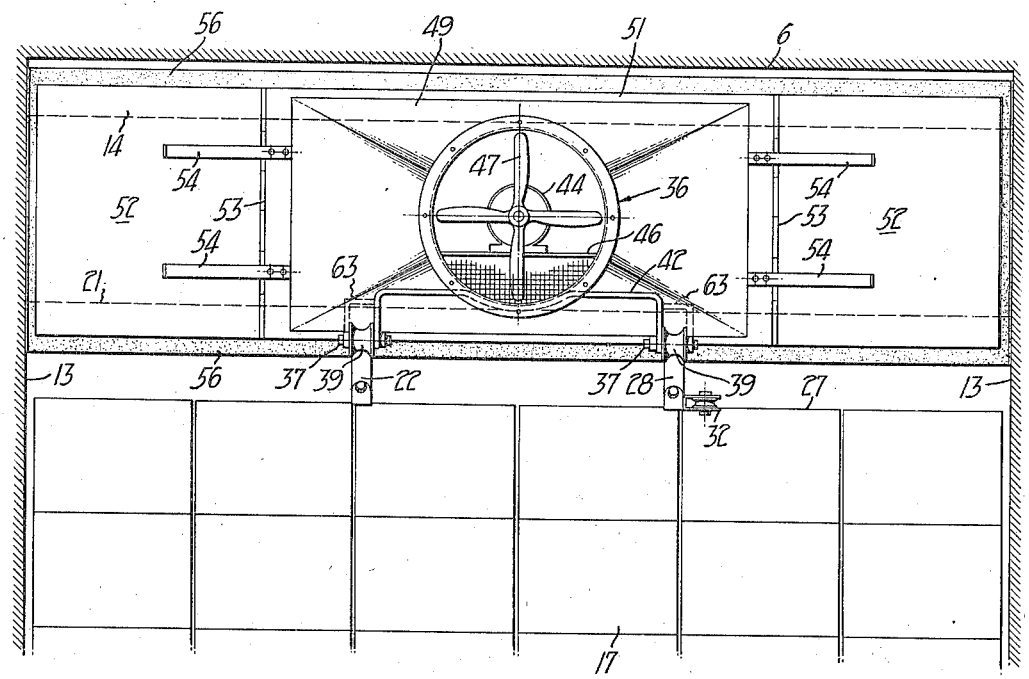
Fig. 5 is a front elevation of the structure shown in Fig. 4.
Figure 6:
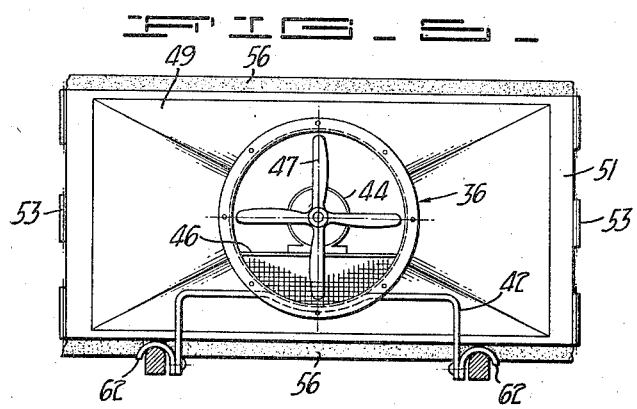
Fig. 6 is a fragmentary view, similar to Fig. 5, showing a modified form of structure.

In a modification of this arrangement, it is not necessary to utilize rollers 39 upon the carriage, but, as shown in Fig. 6 in front elevation, semicircular skids 62 may be substituted for the rollers, since the friction upon the rails is relatively slight. Furthermore, there may be cutaway portions 63, as indicated by the dotted lines in Fig. 5, in the event that the straps or hooks 26 interfere with tight seating of the closure against the bulkhead opening.

In accordance with my invention, I have provided readily portable and improved means for installing a precooler unit in a loaded refrigerator car, for propelling the unit into operating position, for tightly sealing the closure against the walls around the opening so that leakage of air is precluded without the use of any especial fastening means, for quickly releasing the unit when its cooling operation has been completed, for withdrawing the unit from operative position to a removing position, and for vacating all of the equipment from the car with great facility and with the requirement and services of but a single operator.

I claim:

1. A car cooler for use in a car having a load compartment, an ice compartment and a bulkhead wall defining a bunker opening between said compartments comprising a closure adapted to overlie said opening, means for supporting said closure for movement toward and away from said opening, and means on said closure for establishing a difference in pressure on opposite sides thereof for urging said closure to overlie said opening.

2. A car cooler for use in a car having a load compartment, an ice compartment and a bulkhead wall defining a bunker opening between said compartments, a closure for said opening, a fan on said closure, and means for mounting said closure to press against said wall in response to the thrust of said fan.

3. A car cooler for use in a car having a load compartment, an ice compartment and a bulkhead wall defining a bunker opening between said compartments comprising a closure adapted to overlie said opening, a rail for supporting said closure, and means effective when energized to urge said closure along said rail and into close abutment with said bulkhead wall.

4. A car cooler for use in a car having a load compartment, an ice compartment and a bulkhead wall defining a bunker opening between said compartments comprising a rail overlying a load in said load compartment, a closure for said opening supported on said rail, and means effective when energized to urge said closure to abut said bulkhead wall.

5. A car cooler for use in a car having a load compartment, an ice compartment and a bulkhead wall defining a bunker opening between said compartments comprising a rail extending from said bunker wall substantially to the center of said load compartment, a car cooling unit adapted to overlie said opening supported on said rail, and means for propelling said cooling unit along said rail.

6. A car cooler for use in a car having a load compartment, an ice compartment and a bulkhead wall defining a bunker opening between said compartments comprising a rail resting upon said bunker wall and upon a load in said load compartment, and a car cooling unit supported on said rail.

7. A car cooler for use in a car having a load compartment, an ice compartment and a bulkhead wall defining a bunker opening between said compartments comprising a pair of rails resting upon said bulkhead wall adjacent said bunker opening and upon a load in said load compartment, a car cooling unit including a carriage engaging said rails, and means for propelling said cooling unit along said rails to overlie said bunker opening.

8. A car cooler for use in a car having a load compartment, an ice compartment and a bulkhead wall defining a bunker opening between said compartments comprising a support extending from said bulkhead wall over a load in said load compartment, a car cooling unit carried by said support, and means for moving said cooling unit on said support into substantial abutment with said bulkhead wall.

9. A car cooler for use in a car having a load compartment, an ice compartment and a bulkhead wall defining a bunker opening between said compartments comprising a rail support extending over a load in said load compartment, a closure for said opening carried by said support, a fan driven by an electric motor mounted on said closure, means for propelling said closure on said support into substantial abutment with said bulkhead wall, and means for energizing said motor to drive said fan in a direction to urge said closure toward said bulkhead wall.

10. A car cooler for use in a car having a load compartment, an ice compartment and a bulkhead wall defining a bunker opening between said compartments comprising a rail support extending over a load in said load compartment, a closure for said opening resting on said support, a fan on said closure, and means for operating said fan to urge said closure toward said bulkhead wall.

11. A car cooler for use in a car having a load compartment and a bulkhead wall defining a bunker opening between said compartments, comprising a rail substantially half as long as said load compartment, means for temporarily supporting said rail to extend longitudinally of said load compartment, and a car cooling unit supported by said rail and adapted to overlie said opening.

12. A car cooler for use in a car having a load compartment, an ice compartment, and a bulkhead wall defining a bunker opening between said compartments; comprising a rail adapted to overlie a load disposed in said load compartment and to extend from a point adjacent the center of the car toward said bulkhead, and a car cooling unit supported on said rail and movable thereon to a position in which said unit seals said bunker opening.

GEORGE HUGHES.